United States Patent
Farres et al.

(10) Patent No.: US 10,046,746 B2
(45) Date of Patent: Aug. 14, 2018

(54) METHOD FOR PILOTING A BRAKING SYSTEM OF A VEHICLE, BRAKING SYSTEM AND VEHICLE COMPRISING SUCH A BRAKING SYSTEM

(71) Applicant: VOLVO TRUCK CORPORATION, Göteborg (SE)

(72) Inventors: Lionel Farres, Saint-Priest (FR); Jean Sebastien Carle, Lyons (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/317,178

(22) PCT Filed: Jul. 2, 2014

(86) PCT No.: PCT/EP2014/001813
§ 371 (c)(1),
(2) Date: Dec. 8, 2016

(87) PCT Pub. No.: WO2016/000730
PCT Pub. Date: Jan. 7, 2016

(65) Prior Publication Data
US 2017/0113670 A1  Apr. 27, 2017

(51) Int. Cl.
*B60T 13/66* (2006.01)
*B60T 13/68* (2006.01)
(Continued)

(52) U.S. Cl.
CPC .......... *B60T 13/662* (2013.01); *B60T 13/683* (2013.01); *B60T 17/02* (2013.01); *B60T 17/22* (2013.01);
(Continued)

(58) Field of Classification Search
CPC ...... B60T 13/662; B60T 13/683; B60T 17/02; B60T 17/22; B60T 17/221; B60T 2270/402
See application file for complete search history.

(56) References Cited

U.S. PATENT DOCUMENTS

| 4,919,492 A * | 4/1990 | Samuelson | B60T 8/1881 303/15 |
| 2004/0151606 A1 * | 8/2004 | Doerr | B60T 17/02 417/380 |

(Continued)

FOREIGN PATENT DOCUMENTS

| DE | 102 54 818 A1 | 6/2004 |
| EP | 2 241 488 A | 10/2010 |

(Continued)

OTHER PUBLICATIONS

International Search Report (dated Oct. 3, 2015) for corresponding International App. PCT/EP2014/001813.

Primary Examiner — Vishal R Sahni
(74) Attorney, Agent, or Firm — WRB-IP LLP (57) ABSTRACT

A method allows piloting a braking system of a vehicle, the braking system including at least a pair of coupled brake actuators, that includes a pneumatic actuator supplied with a compressed air tank pressurized by a compressor, and an electric actuator. The method includes steps including a) measuring the air pressure of the air tank, b) if the air pressure measured at step a) is inferior to a first threshold value, assessing whether the compressor is able to build up the air pressure of the air tank, c) if the result of the assessment performed at step b) is that the compressor is unable to build up the air pressure of the air tank, operating the braking system in a degraded mode wherein at least the electric actuator is used in case of braking, and d) if the air pressure measured at step a) is inferior to a second threshold
(Continued)

value, that is lower than the first threshold value, and if the compressor is unable to build up the air pressure of the air tank, using only the electric actuator in case of new braking actions.

14 Claims, 5 Drawing Sheets

(51) Int. Cl.
*B60T 17/02* (2006.01)
*B60T 17/22* (2006.01)

(52) U.S. Cl.
CPC ....... *B60T 17/221* (2013.01); *B60T 2270/402* (2013.01)

(56) References Cited

U.S. PATENT DOCUMENTS

| | | | |
|---|---|---|---|
| 2008/0040013 A1* | 2/2008 | Detlefs | B60T 13/68 701/78 |
| 2009/0280959 A1* | 11/2009 | Bensch | B60T 8/1708 477/198 |
| 2012/0203437 A1* | 8/2012 | Diekmeyer | B60T 7/122 701/70 |
| 2014/0136068 A1* | 5/2014 | Peltz | B60T 17/22 701/70 |

FOREIGN PATENT DOCUMENTS

| | | |
|---|---|---|
| JP | H08 258693 A | 10/1996 |
| WO | 03014588 A1 | 2/2003 |
| WO | 2005/014360 A1 | 2/2005 |
| WO | 2008030204 A1 | 3/2008 |

* cited by examiner

METHOD FOR PILOTING A BRAKING SYSTEM OF A VEHICLE, BRAKING SYSTEM AND VEHICLE COMPRISING SUCH A BRAKING SYSTEM

BACKGROUND AND SUMMARY

The present invention relates to a method for piloting a braking system of a vehicle, in particular, this method is adapted to be implemented with a braking system comprising at least a pair of coupled brake actuators, that includes a pneumatic actuator and an electric actuator. The invention also concerns a braking system associated with this method and a vehicle, such as a truck, equipped with such a braking system.

The invention can be applied in heavy-duty vehicles, such as trucks, buses and construction equipment. Although the invention will be described with respect to a truck, the invention is not restricted to this particular vehicle, but may also be used in other vehicles, such as tractors and vans.

In the field of brake actuation, it is known to use actuators working with two different energy sources. An actuator of this kind may be known as a "bi-energy actuator".

For instance, WO-A-03/014588 discloses a disk brake caliper working both with hydraulic and electric energy. Indeed, this disk brake caliper includes a hydraulic service brake actuator and an electric parking brake actuator. Two disk brake pads are located on either side of a brake disc to be braked. The hydraulic actuator includes a piston disposed within a cylinder. A thrust chamber is delimited between the rear of the piston and a moving casing of the caliper. When fluid is injected in the trust chamber, the piston moves towards the brake disc under the hydraulic pressure and pushes a first disk brake pad against the brake disc. Simultaneously, the casing of the caliper moves in the opposite direction under the hydraulic pressure and a second disk brake pad, which is secured to the moving casing of the caliper, comes into contact with the brake disc. Consequently, the brake disc is squeezed between the two disk brake pads and is slowed down by friction. The electric actuator produces the same disk brake pad shifting movement than the pneumatic actuator. It may be activated alone or in cooperation with the hydraulic actuator. The electric actuator includes a rod for pushing the first disk brake pad against the brake disk. The rod is in threaded engagement with a mated female thread formed on the internal surface of a bore delimited in the casing. The rod is translated by means of a worm gear that is in meshed engagement with another worm gear driven by an electric motor. The rotation of the rod inside the bore involves the rod to move towards the brake disk and the casing to move in the opposite direction. Consequently, the brake disc is squeezed between the two disk brake pads, thereby inducing friction and the braking action.

WO-A-2008/030204 also discloses a "bi-energy" actuator. In particular, the second design disclosed in this document corresponds to an electro-pneumatic brake actuator that comprises a pneumatic brake actuator powered by compressed air and an electric brake actuator that is powered by electricity. The pneumatic brake actuator comprises a casing that delimits a service chamber. The service chamber is in contact with a diaphragm made of rubber. When filling the service chamber with compressed air, the diaphragm overturns and pushes a flange connected to a drive rod, which implies braking. The electric brake actuator is realized by an electric motor whose outlet shaft is connected, by means of a set of gears, to the drive rod of the brake. In parking conditions, the electric brake actuator and the pneumatic brake actuator are operated in parallel while in service conditions, the pneumatic brake actuator and the electric brake actuator are operated consecutively, with the pneumatic brake actuator being operated first. Both brake actuators are operated in a complementary manner, so as to exert an adequate braking force.

The two above mentioned documents disclose a bi-energy actuator but do not disclose a method for piloting it in case of an accidental depressurization of the compressed air source that supplies the pneumatic actuator, which corresponds to a degraded mode.

Each pneumatic actuator of a vehicle is supplied with a main compressed air source that is boarded on the vehicle. In case of a truck, the brakes, the gear box and the wheels suspension can also be powered with compressed air. The compressed air source is typically an air tank that is pressurized at an adequate pressure by a compressor. In operation, the air pressure in the air tank decreases when operating one or more pneumatic actuators. When the pressure in the air tanks falls at or under a cut-in pressure, the air tank pressure is build up, or "repressurized" up to a cut-off pressure that is to say to a upper pressure limit in the air circuit, preferably in the air tank, at which or above which the compressor is stopped or is put on a stand-by mode. The cut-in pressure corresponds to a lower pressure limit in the air circuit, preferably in the air tank, at which or under which the compressor has to be re-started in order to build up the pressure in the air tank.

However, if the compressor is malfunctioning or if a leakage occurs in the distribution air system, the pressure of the air tank may fall under the cut-in pressure, without the compressor being able to build up the air tank pressure. In this case, the pneumatic actuators, such as pneumatic brake actuators, may run out of energy to operate. This is dangerous because the driver is then unable to slow down the vehicle.

It is desirable to provide a method for piloting a bi-energy braking system, which takes into account a possible malfunctioning of the compressor or an air leakage in the air distribution system, by operating a degraded mode. In this degraded mode, the method according to an aspect of the invention allows saving pneumatic energy by activating the brake electric actuator, which operates alone or in a complementary manner with the brake pneumatic actuator. As far as possible, an aspect of the method aims at keeping a certain amount of energy to power the essential actuators of the vehicle, such as, when the vehicle comprises a truck and a trailer, for powering the brakes of the truck and the brakes of the trailer.

To this end, the invention concerns, according to an aspect thereof, a method for piloting a braking system of a vehicle. This braking system comprises at least a pair of coupled brake actuators that includes a pneumatic brake actuator supplied with compressed air coming from an air tank that is pressurized by a compressor, and an electric brake actuator. According to an aspect of the invention, this method comprises the steps of:

a) measuring the air pressure of the air tank.

b) if the air pressure measured at step a) is inferior to a first threshold value, assessing whether the compressor is able to build up the air pressure in the air tank, c) if the result of the assessment performed at step b) is that the compressor is unable to build up the air pressure of the air tank, operating the braking system in a degraded mode wherein at least the electric brake actuator is used in case of new braking actions, and d) if the air pressure measured at step a) is inferior to a second threshold value, that is lower than the first threshold value, and if, according to the result of step b), the compressor is unable to build up the air pressure of the air tank, using only the electric brake actuator in case of new braking actions.

By the provision of a method which comprises a degraded mode, when the compressor is malfunctioning or when an air leakage occurs in the air distribution system, the electric brake actuator of the actuating system takes over the pneumatic actuator so as to save pneumatic energy. Depending on the air pressure level measured in the air tank, the electric actuator may be used alone or in cooperation with the pneumatic actuator.

According to further aspects of the invention which are advantageous but not compulsory, such a method may incorporate one or several of the following features:

If the air pressure measured at step a) is between the first and the second threshold values, then the pneumatic brake actuator and the electric brake actuator are used together in case of new braking actions.

Steps c) and d) may include a sub-step a) that consists in or comprises measuring the state of charge of a vehicle battery that is normally used to power the electric brake actuator according to step c) or d).

Steps c) and d) include a sub-step β) posterior to step a), that consists in or comprises, if the state of charge of the vehicle battery is lower than a predetermined value, activating as backup battery to power the electric brake actuator according to step c) or d).

Preferably, following the sub-step β) a predetermined number of new braking actions is performed before a stopping rule of the vehicle is activated or following the sub-step β) a given distance is travelled by the vehicle before a stopping rule of the vehicle is activated.

The method may further comprise a step e) that consists in or comprises, if the air pressure measured at step a) is inferior to a third threshold value, that is lower than the second threshold value, and if, according to the result of step b), the compressor is unable to build up the air pressure of the air tank, using only the electric brake actuator in case of new braking actions and activating a stopping rule of the vehicle after the performance of a predetermined number of new braking actions or after the vehicle has traveled a given distance since the braking system has been operated in the degraded mode or since the air pressure has been detected as being inferior to the third threshold value.

A predetermined number of new braking actions can be performed at steps c) and/or d) before a stopping rule of the vehicle is activated.

The predetermined number of new braking actions allowable at step c) is preferably superior to that at step d).

In a variant, a stopping rule of the vehicle can be activated at steps c) and/or d) after the vehicle has traveled a given distance since the braking system has been operated in the degraded mode.

The stopping rule of the vehicle consists in or comprises immobilizing automatically the vehicle when safe standstill conditions of the vehicle are detected.

The safe standstill conditions of the vehicle are preferably detected when the speed of the latter falls below a certain value and/or when park brake activation is detected.

The first threshold value is lower than or equal to the cut-in pressure of the air tank, that is the pressure at which the air tank pressure is normally build up by the compressor.

Warning signals can be sent to the driver of the vehicle at steps c) and d).

This invention also concerns a braking system of a vehicle, this braking system comprising at least a pair of coupled brake actuators that includes a pneumatic brake actuator supplied with a air tank pressured by a compressor, and an electric brake actuator. According to an aspect of the invention, this braking system includes:
  means for automatically measuring the pressure of the air tank,
  means to compare the measured pressure to a first threshold value and to a second threshold value and to assess whether the compressor is able to build up the air pressure of the air tank, these means being adapted to:
    i. if the measured pressure is inferior to the first threshold value and if the compressor is unable to build up the air pressure of the air tank, operate the braking system in a degraded mode wherein at least the electric brake actuator is used in case of new braking actions, and
    ii. if the measured pressure is inferior to the second threshold value, that is lower than the first threshold value, and if the compressor is unable to build up the air pressure of the air tank, use only the electric brake actuator in case of new braking actions.

Finally, the invention relates according to an aspect thereof, to a vehicle equipped with a braking system as previously defined.

BRIEF DESCRIPTION OF THE DRAWINGS

The invention will now be explained in correspondence with the annexed figures, and as an illustrative example, without restricting the invention. In the annexed figures.

DETAILED DESCRIPTION

Figure 1:
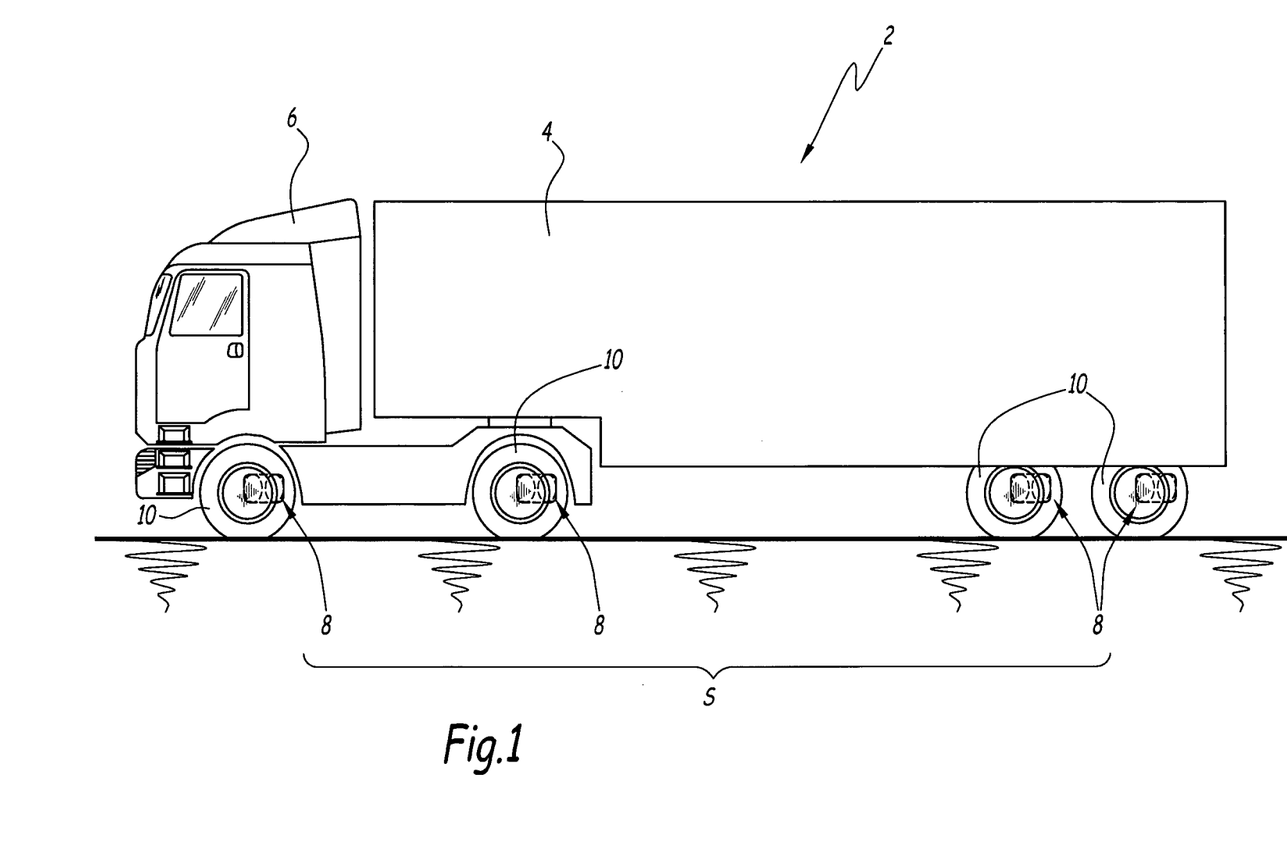
FIG. 1 is side view of a truck comprising a plurality of bi-energy brake actuators.

FIG. 1 represents a truck 2 comprising a traction unit or lorry 6. The lorry 6 tows a trailer 4 and may comprise two pairs of wheels 10. The trailer 4 may include two pairs of rear wheels 10. The truck 2 includes a braking system S that comprises a plurality of actuators arranged in pairs 8. Each pair 8 of brake actuators of the truck is composed of two coupled brake actuators that function respectively with pneumatic and electric energy. That is why the pairs of actuators 8 are known as "bi-energy" brake actuators. Each "bi-energy" actuator 8 is adapted to brake a pair of wheels 10 or the truck 2 by acting on an axle of two opposite wheels. The trailer 4 includes a braking system which comprises pneumatic actuators. However, such as presented on FIG. 1, the braking system of the trailer can also be equipped with "bi-energy" brake actuators.

Figure 2:
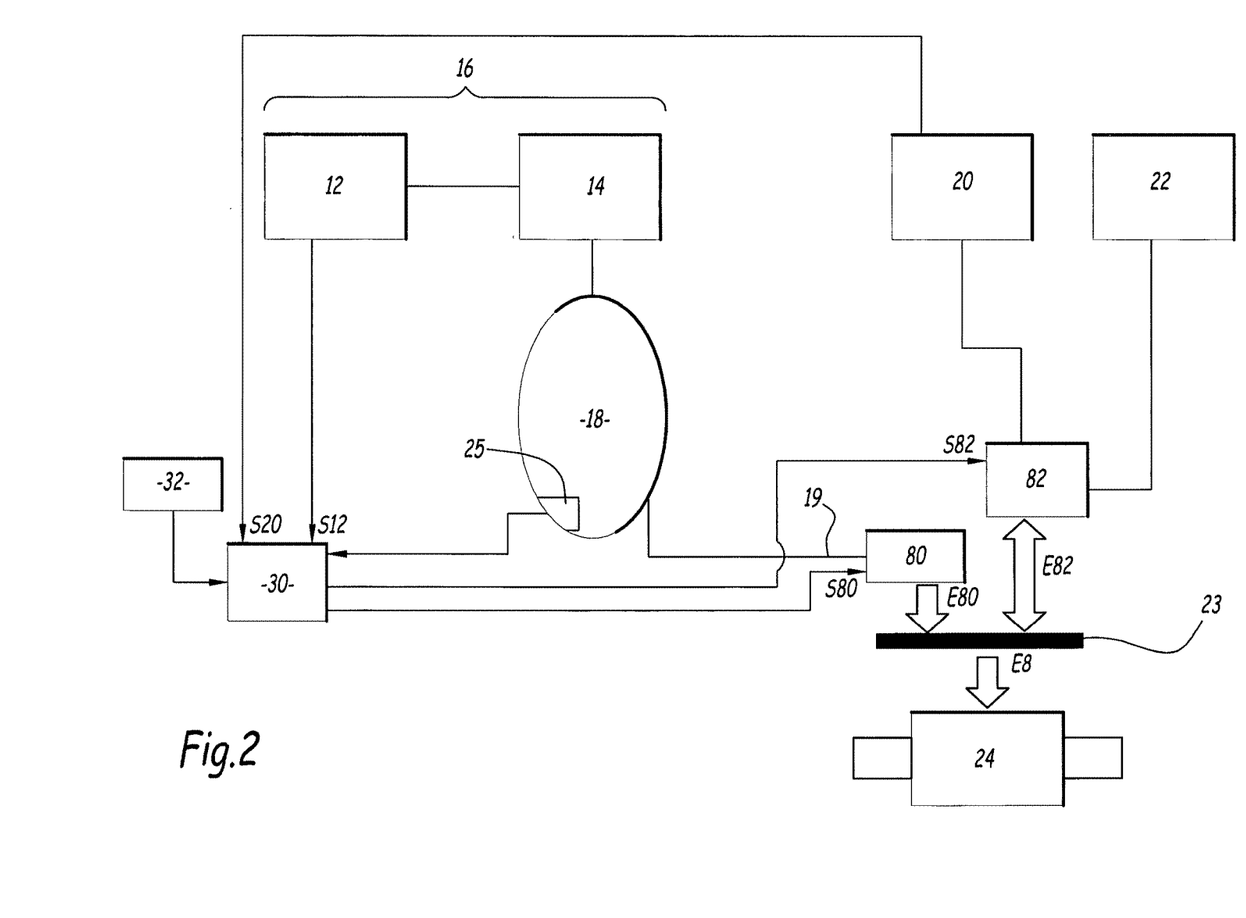
FIG. 2 is a graphic illustrating the air distribution system for a bi-energy actuator of the truck of FIG. 1, and
  FIGS. 3 to 5 are graphics showing the steps to implement three different methods for piloting a braking system according, to the invention.

As shown on FIG. 2, each "bi-energy" actuator 8 of the truck 2 includes a pneumatic brake actuator 80 and an electric brake actuator 82 that can act both on a brake caliper 24. More precisely, the pneumatic brake actuator 80 and the electric brake actuator 82 generate respectively an effort E80 and E82 that can be applied on a transfer module 23. Such as represented on FIG. 2, the transfer section can be a transfer plate. E8 denotes the effort transmitted via the transfer module 23 to the brake caliper 24. E8 is the sum of the efforts E80 and E82, which means that the transfer plate 23 allows adding up the efforts delivered by the actuators. The electric brake actuator 82 is preferably reversible, or bi-stable, which means that it needs energy to be withdrawn. That is why the arrow showing the action of the electric brake actuator 80 on the brake caliper 24 is double-headed on FIG. 2. The electric brake actuator 82 is normally powered by means of a battery 20 of the truck 2. This battery 20 is the vehicle battery. It is charged by means of an alternator that is driven by the vehicle internal combustion engine. The truck 2 is also equipped with a backup battery 22 that is activated if the vehicle battery 20 is discharged or is in a failure mode.

Each pneumatic brake actuator 80 of the truck 2 is supplied with compressed air that is delivered by a main compressed air tank that is boarded on the vehicle. In case of vehicle assembly comprising a truck and a trailer, brake actuators of the truck and of the trailer, are at least powered with compressed air coming from the air tank 18 of the truck. Some other actuators or equipment such as the gear box and some wheel suspensions of the truck can also be powered with compressed air coming from the air tank 18. The air tank 18 is pressurized at an adequate pressure by a compressor 12. An air treatment system 14 comprising, for instance, a desiccant cartridge is preferably arranged between the compressor 12 and the air tank 18 so as to treat the air provided by the compressor 12 and to remove water, oil and other unwanted particles from the air. In this way, the pneumatic actuators of the truck 2 are less polluted. Each pneumatic actuator 80 is supplied through a feeding line 19 extending from the air tank 18. 16 denotes the distribution air system. It includes the compressor 12, the air treatment system 14, the air tank 18 and all feeding lines 19. The distribution air system 16 may also comprise some valves, such as a brake controlling valve usually located on the feeding line 19.

The air tank 18 is sized to supply all of the pneumatic actuators of the truck 2 with the appropriate pressure. For instance, the air tank 18 may have a capacity of about 120 L. The air tank 18 must be able to provide a brake actuator with an amount of energy sufficient in case of a maximal braking action, which corresponds to a volume of air at a pressure of about 10 bars. The hydraulic jacks that allow lifting the trailer 4, the gear box, the parking brake and the seat lifters usually require a volume of air at a pressure of 8.5 bars. The nominal pressure, or "declared pressure", at the trailer control line is also about 8.5 bars.

Moreover, the air tank 18 must be sized to allow, without compressor reactivation, a vehicle deceleration of at least 2.2 m/s"2 at the ninth braking action performed by the driver and it must also be sized so that after this ninth braking action, pressure in the air tank 18 remains sufficient for the trailer braking system. In practice the remaining pressure in the air tank 18 has to be equal to or higher than half of the declared pressure at the trailer control line, that is to say in the present case equal or higher than 4.25 bars.

In the light of all sizing and design constraints, the pressure of the air tank 18 must be superior to a cut-in pressure. This means that the compressor 2 normally builds up, or "repressurizes", the air tank 18 when its pressure fails under the cut-in pressure, for instance 8 bars. The buildup of the air tank pressure goes on as long as the pressure is under a cut-off pressure, for instance 12.5 bars. In practice, if the pressure of the air tank 18 exceeds the cut-off pressure, the air tank 18 is expanded and the residue of air is exhausted. This residue of air may be used to clean the filter 14. As a result, in normal conditions, the pressure of the air tank 18 is comprised between the cut-in pressure, for instance 8 bars and the cut-off pressure 12.5 bars. The above numerical values are chosen as an example. For instance, the nominal pressure depends on the design of the braking system S and is adjusted in accordance.

Three methods for piloting the braking system according to an aspect of the invention are detailed here-below, in reference to FIGS. 3 to 5. On these figures, the diamond-shaped boxes are comparison or decision steps while the rectangular boxes are action steps. The comparison or decision steps are referenced with a number in the first hundred while the actions steps are referenced in the third hundred. Concerning a decision or a comparison step, the letters "Y" and "N" denote the result of the decision or of the comparison, as respectively for YES and NO. Besides, steps relating to the same action or to the same comparison/decision have the same numerical reference, even if they are implemented at different stages of the method.

Figure 3:
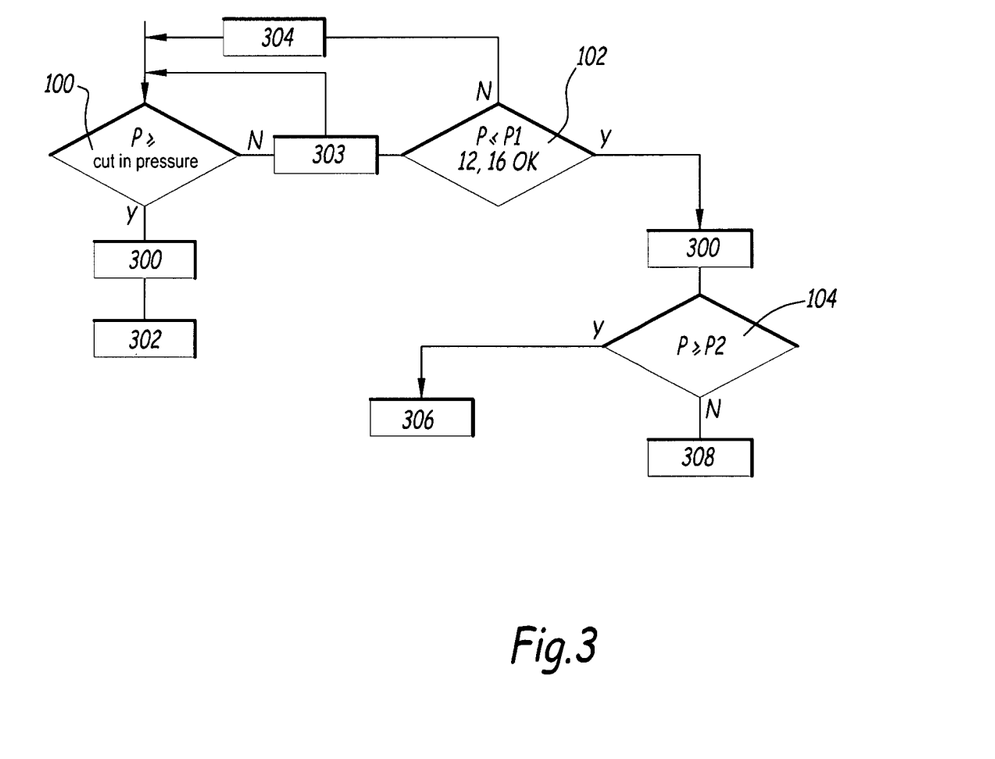

FIG. 3 represents the steps to implement a first method that is the most basic amongst the three methods.

According to a preliminary step 100, the pressure P of the air tank 18 is measured and compared to the cut-in pressure, e.g.: 8 bars. If at step 100, it is detected that the pressure P is below the cut-in pressure, the compressor 12 is normally controlled to be restarted at a step 303, so as to build up the air pressure in the air tank 18. If the air pressure P of the air tank 18 is superior to the cut-in pressure, the pneumatic brake actuator 80 is preferably operated alone, at a step 302, in case of a braking action 300. This is the normal mode.

However, an incident, preventing the air pressure in the air tank 18 from building up, can occur in the air distribution system 16. To this end, the air pressure P of the air source tank 18 is measured and is compared at a step 102 with a first threshold pressure P1. If it is detected that the pressure P of the air tank 18 falls at or below the first threshold pressure P1, in step 102 or in a dedicated step of the method, it is assessed whether the compressor 12 is able or not to build up the air tank pressure P. The first threshold pressure P1 can be lower than or equals to the cut-in pressure. If the first threshold pressure P1 is lower than the cut-in pressure it can be for instance equal to 7.5 bars.

To perform this assessment, it is, for instance, possible to check how long the pressure P is at or under the first threshold pressure P1. If the pressure P remains inferior to P1 for a period longer than a predetermined duration T1, for instance 10 seconds, the compressor 12 is considered as being unable to build up the air tank pressure P. That means that the compressor 12 cannot be restarted, that the compressor 12 is not working properly or that there is a leakage in the air distribution system 16 so that the compressor 12 is unable to build up the air tank pressure P. The leakage in the air distribution system 16 may occur in the air tank 18 or in the piping which includes the feeding lines 19.

In a variant, instead of or in a complementary way regarding the first possibility just here before described, to perform the assessment according to step 102, some sensors can be provided directly on the compressor 12 to determine whether the compressor 12 is operating under normal conditions, is operating abnormally or is stopped.

In another variant, instead of or in a complementary way regarding the first possibility here before described, the energy consumed by the compressor 12 can be monitored to determine if the compressor 12 is operating under normal conditions, is operating abnormally or is stopped.

If it is determined that the compressor 12 is able to build up the air tank pressure P and if the compressor 12 has not been yet restarted according to step 303, for instance for fuel economy reasons, the compressor 12 is restarted in step 304 following the assessment performed in step 102.

If it is assessed that the compressor 12 is not able to build up the air tank pressure P, the braking system S of the vehicle 2 is then operated in a degraded mode wherein at least the electric brake actuator 82 is used in case of a further braking action 300. In degraded mode, the pressure P of the air tank 18 is further compared at a step 104 with a second threshold value P2 that is lower than the first threshold value P2 and that can be, for instance, equal to 6 bars (P2=6 bars). If the pressure P of the air tank 18 is above the second threshold value P2, the pneumatic brake actuator 80 and the electric brake actuator 82 are both used at a step 306 in case of a further braking action 300. In other words, the two actuators 80 and 82 cooperate together to provide the brake caliper 24 the adequate amount of braking energy. This avoids relying only on electric energy, because it would be very dangerous in case of a blackout.

However, if the air pressure P of the air tank 18 is lower than the second threshold value P2, the electric brake actuator 82 is used alone at a step 308 in case of braking, so as to save pneumatic energy to the actuators that cannot be operated otherwise, such as the pneumatic brake actuators of the trailer.

The above numerical values are chosen as examples in relation to the nominal pressure (8.5 bars) of the circuit given also here above as an example.

Figure 4:
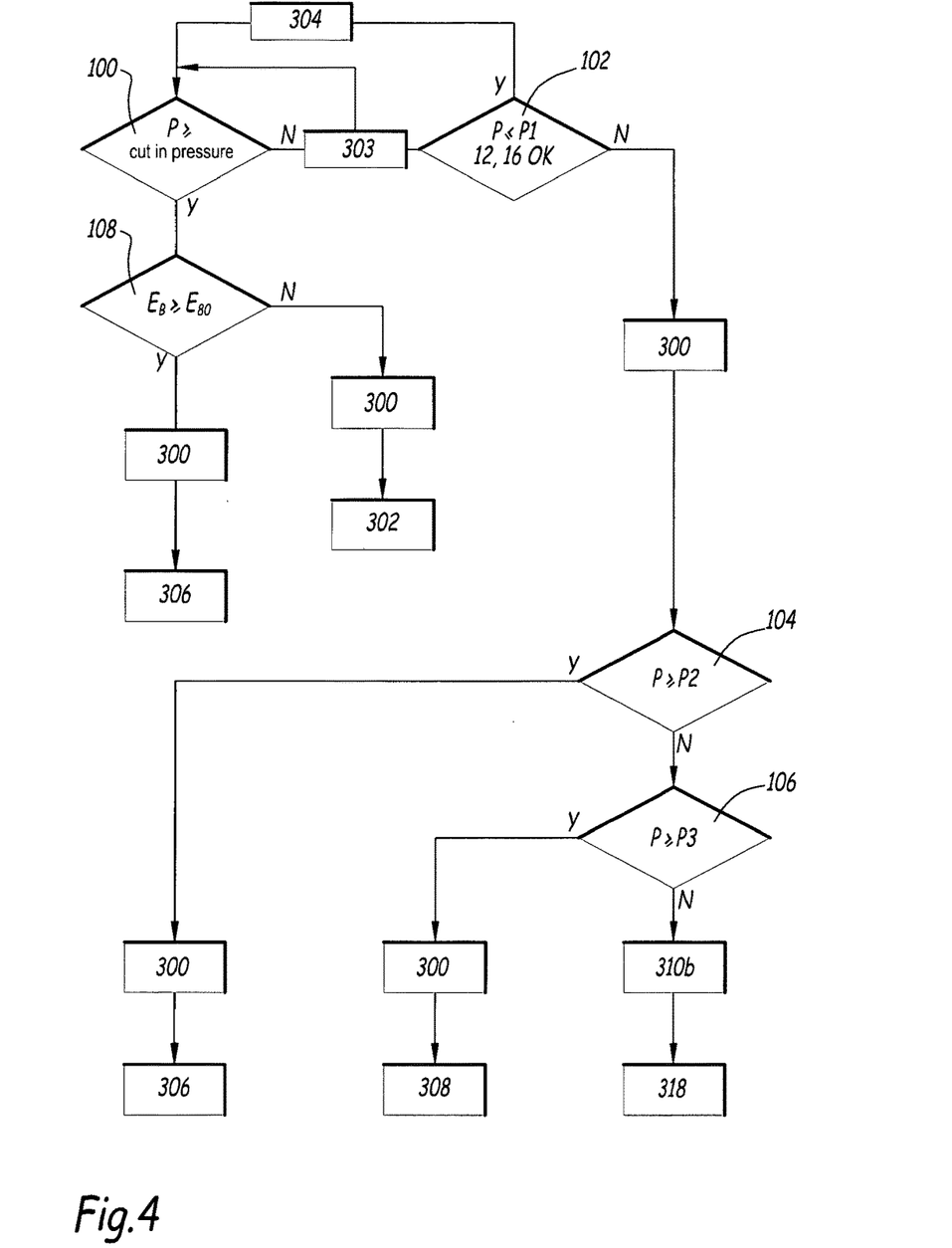

FIG. 4 shows the steps to implement another method for piloting the braking systems S. This method comprises supplementary steps in comparison to the first method. In the normal mode, the method further includes a step 108 that consists in or comprises assessing whether the braking energy EB required by the driver when pushing the pedal brake is superior to the energy E8o that can provide the pneumatic actuator 80. Indeed, the cut-in pressure of the air tank 18 is usually chosen lower than the pressure that requires a braking action 300 at maximal intensity. The cut-in pressure is consequently lower than the maximum pressure that can feed the pneumatic brake actuators. The compressor 12 is accordingly shut down for a longer period because the air tank 18 takes longer to discharge. As a result and in a preferred way of operating, the compressor 12 can be activated only during downhill portion of the road, which allows saving fuel energy. If the pneumatic energy contained in the air tank 18 is not sufficient to perform the braking action 300 requested by the driver, the electric brake actuator 82 is operated with the pneumatic brake actuator 80, in a complementary manner, at a step 306.

Further, if the pressure P of the air tank 18 is lower than the second threshold value P2, the method provides a supplementary step 106 that consists in or comprises comparing the air pressure P with a third threshold value P3 that is inferior to the second threshold value P2.

The third threshold value P3 is preferably equal to half of the declared pressure and for instance 4.25 bars. If the air pressure P measured in the air tank 18 is lower than this third threshold P3, a stopping rule 318 is activated. This stopping rule 318 consists in or comprises immobilizing automatically the vehicle when safe standstill conditions of the vehicle are detected. Safe standstill conditions can be detected, for instance, when the speed of the latter falls below a certain value, that is about 5 km/h and/or when activating of the parking brake is detected. Activating the stopping rule 318 allows the user to drive the truck on a safe place and prevents the driver from driving a long time in degraded mode.

The activation of the stopping rule 318 can be preceded by a warning signal, that is sent to the driver at a step 310b. This warning signal alerts the driver that there is a problem in the a distribution system 16 and that the vehicle is about to be automatically immobilized.

Figure 5:
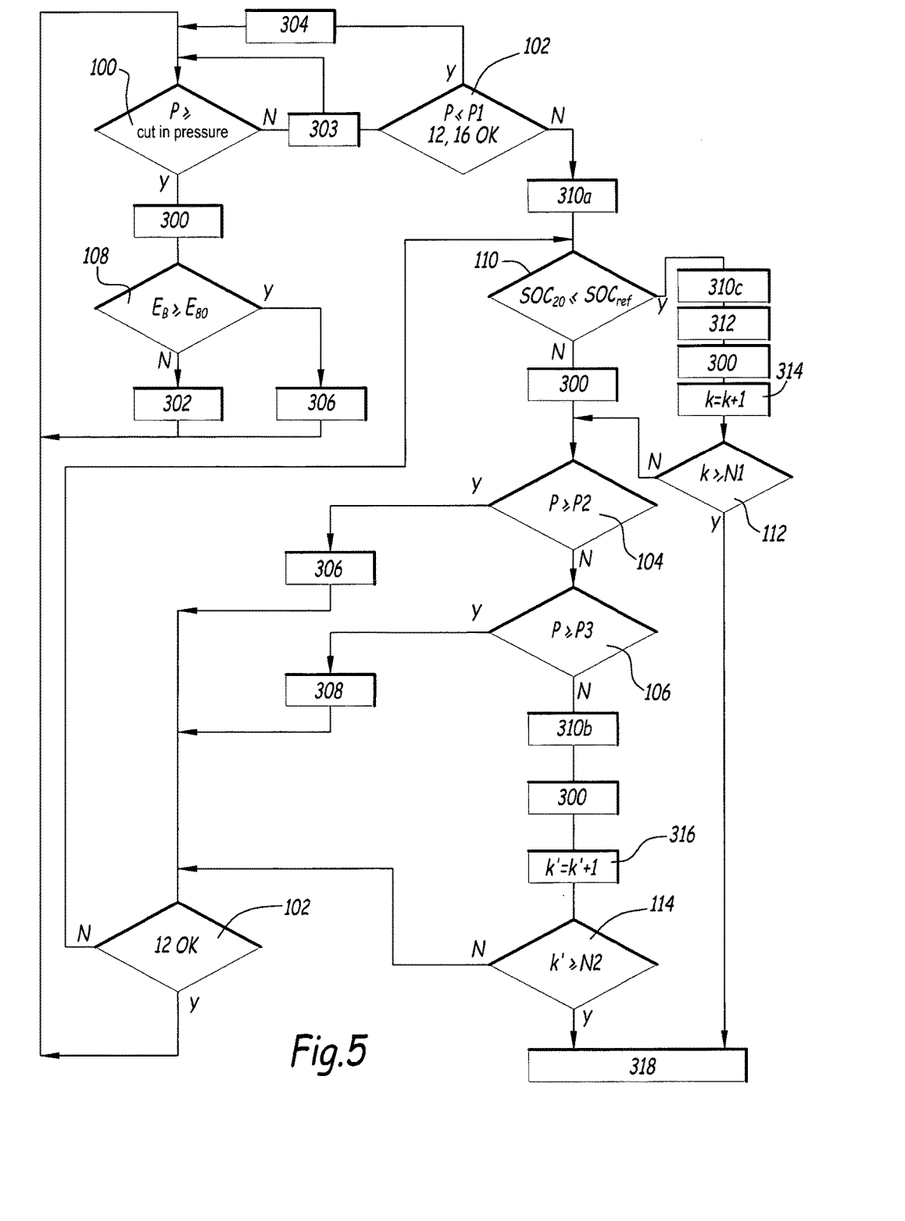

FIG. 5 represents another method for piloting the braking system S. This method further comprises a step 110 that consists or comprises, in a battery degraded mode, to assess whether the state of charge SOC20 of the vehicle battery 20 is sufficient to perform the braking action 300 requested by the driver. In practice, the method includes a sub-step that consists in or comprises measuring the state of charge of the battery 20 and comparing it with a predetermined value SOCref. SOCref can be comprised between 5 and 20% of the battery capacity and, for instance, it can be about 10% of the battery capacity. These values are only given as an example, since they depend on the electrical motor that is used and on the needed peak of current. If the state of charge SOC20 of the battery 20 is lower than this predetermined value SOCref, the backup battery 22 is activated at a step 312. The activation of the backup battery 22 can be preceded by a warning signal, that is sent to the driver at a step 310c. The backup battery 22 is preferably dedicated to this application, which means that it is only activated in the battery degraded mode for the vehicle braking system.

In the example of FIG. 5, one or more warning signals can also be sent to the driver at a step 310a so as to inform the driver that the braking system S has switched into the degraded mode.

Warning signals 310a, 310b, 310c may be lights and/or audible signals. The warning signals 310a can be different in function of the level of pressure in the air tank 18. In addition, another kind of warning signal 310c, 310b can be sent if the vehicle battery 20 is discharged or if the stopping rule 318 is activated. The warning signals 310a and 310b alert the driver that there is a problem in the air distribution system 16 and/or indicate him to stop the vehicle. Further signals may indicate to the driver that if the vehicle is not stopped, it is about to be automatically braked. This allows assisting the driver to stop its vehicle under safe conditions.

The backup battery 22 is designed to provide a predetermined number N1 of braking actions 300. This predetermined number N1 is preferably inferior, for instance of 50%, to the minimum number of braking actions 300, that can be performed by the electric actuator 82 with the energy of the backup battery 22. Therefore, a counter k is incremented at a step 314 each time the driver pushes the brake pedal. This counter k is compared, after each brake action 300 and at a step 114, with the predetermined number of braking actions N1. When the predetermined number of braking actions N1 is reached, the stopping rule 318 is activated. This allows preventing the driver from driving a long time before stopping the vehicle.

If the state of charge SOC20 of the vehicle battery 20 is superior to the predetermined value SOCref then the steps are implemented in a similar manner than with the method of FIG. 4.

In addition, in case the pressure P measured in the air tank 18 is lower than the third predetermined value P3, then a warning signal is sent to driver at a step 310b and a counter k' is incremented at a step 316 after each braking action 300. At this stage, each new braking action 300 is performed by using only the electric brake actuator. The counter k' is compared at a step 316 with an allowable number N2 of braking actions 300. When this counter k' reaches the allowable number N2, the stopping rule 318 is activated. The number N1 is preferably superior to the number N2.

The method further includes a further step 102 that consists in or comprises assessing again whether the compressor 12 is able to build up the air tank pressure P, that is if the air leakage and/or the dysfunction of the compressor problem is solved. The method is iterative, which means that if the problem is solved, the braking system S switches back in normal mode and implements step 100 once again while, if the problem is unsolved, the braking system S remains in degraded mode and the step 316 is implemented again in case of a new braking action 300 and if P<P3.

In a non-represented alternative embodiment, another parameter than the allowable number N1 or N2 of braking actions 300 can be assessed to trigger the stopping rule 318. For instance, this parameter may be the number of kilometers traveled by the truck 2 since the switching in degraded mode at step 102 or since it has been detected a low state of charge SOC20 of the vehicle battery 20 or since the air pressure P has been measured as being inferior to the third threshold value P3.

For the implementation of the methods described hereabove, at least one pressure sensor 25 is preferably integrated to measure the air pressure in the air tank 18 and an electronic control unit or ECU 30 is also provided. More precisely, the pressure sensor 25 measures the air tank pressure P, that is generally the pressure in the air tank 18, while the decision or comparison steps of the methods are automatically performed by the ECU 30. Such as depicted on FIG. 2, an output signal S25 of sensor 25 is provided to ECU 30 which is capable of making computations and comparisons and of piloting brake actuators 80 and 82 via appropriate control signals S80 and S82.

Threshold pressure values P1, P2, P3, are stored in a memory 32 associated to ECU 30. A signal S12 is, for instance, provided by compressor 12 to ECU 30, at step 102, which allows ECU 30 to assess whether compressor 12 is able to build up the air tank pressure P at the right level or not. A signal S20 is provided by battery 20 to ECU 30, which includes some information relative to its state of charge SOC20.

ECU 30 is programmed to automatically perform all the steps represented on FIGS. 3 to 5, depending on the method actually used.

It is to be understood that the present invention is not limited to the embodiments described above and illustrated in the drawings; rather, the skilled person will recognize that many changes and modifications may be made within the scope of the appended claims.

Besides, the technical features of the different embodiments and alternative embodiments of the invention described here-above can be combined together to generate new embodiments of the invention.

The invention claimed is:

1. A method for piloting a braking system of a vehicle, the braking system comprising at least a pair of coupled brake actuators, the coupled brake actuators comprising a pneumatic brake actuator supplied with compressed air coming from an air tank that is pressurized by a compressor and an electric brake actuator, the method comprising:
   a) measuring the air pressure of the air tank,
   b) if the air pressure measured at step a) is less than a first threshold value, assessing whether the compressor is able to build up the air pressure in the air tank,
   c) after determining that the result of the assessment performed at step b) is that the compressor is unable to build up the air pressure of the air tank, operating the braking system in a degraded mode wherein at least the electric brake actuator is used in case of new braking actions,
   d) after determining that the air pressure measured at step a) is less than a second threshold value, the second threshold value being lower than the first threshold value, and if, according to the result of step b), the compressor is unable to build up the air pressure of the air tank, using only the electric brake actuator in case of new braking actions, and
   after determining that the air pressure measured at step a) is between the first and the second threshold values, then using the pneumatic brake actuator and the electric brake actuator together in case of new braking actions.

2. The method according to claim 1, wherein steps c) and d) include a sub-step α) that comprises measuring a state of charge of a vehicle battery that is normally used to power the electric brake actuator according to step c) or d).

3. The method according to claim 2, wherein steps c) and d) include a sub-step β) posterior to step α), that comprises, after determining that the state of charge of the vehicle battery is lower than a predetermined value, activating a backup battery to power the electric brake actuator according to step c) or d).

4. The method according to claim 3, wherein following the sub-step β) performing a predetermined number of new braking actions before a stopping rule of the vehicle is activated or a given distance is travelled by the vehicle before a stopping rule of the vehicle is activated.

5. The method according to claim 1, wherein the method further comprises a step e) that consists, after determining that the air pressure measured at step a) is less than a third threshold value, the third threshold value being lower than the second threshold value, and after determining that the compressor is unable to build up the air pressure of the air tank, using only the electric brake actuator in case of new braking actions and activating a stopping rule of the vehicle after the performance of a predetermined number of new braking actions or after the vehicle has traveled a given distance since the braking system has been operated in the degraded mode or since the air pressure has been detected as being less than the third threshold value.

6. The method according to claim 1, wherein a predetermined number of new braking actions is performed at steps c) and/or d) before a stopping rule of the vehicle is activated.

7. The method according to claim 6, wherein the predetermined number of new braking actions allowable at step c) is greater than that at step d).

8. The method according to claim 1, wherein a stopping rule of the vehicle is activated at steps c) and/or d) after the vehicle has traveled a given distance since the braking system has been operated in the degraded mode.

9. The method according to claim 8, wherein the stopping rule of the vehicle consists in automatically immobilizing the vehicle when safe standstill conditions of the vehicle are detected.

10. The method according to claim 9, wherein safe standstill conditions of the vehicle are detected when a speed of the vehicle falls below a certain value and/or when park brake activation is detected.

11. The method according to claim 1, wherein the first threshold value is lower than or equal to a cut-in pressure of the air tank at which the air tank pressure is normally built up by the compressor.

12. The method according to claim 1, wherein warning signals are sent to the driver of the vehicle at steps c) and d).

13. A braking system of a vehicle, the braking system comprising
- at least a pair of coupled brake actuators that includes a pneumatic brake actuator supplied with a compressed air from an air tank that is pressured by a compressor, and an electric brake actuator,
- means for automatically measuring the pressure of the air tank,
- means to compare the measured pressure to a first threshold value and to a second threshold value and to assess whether the compressor is able to build up the air pressure of the air tank, these means being adapted to:
  i. after determining that the measured pressure is less than the first threshold value and after determining that the compressor is unable to build up the air pressure of the air tank, operate the braking system in a degraded mode wherein at least the electric brake actuator is used in case of new braking actions, and
  ii. after determining that the measured pressure is less than the second threshold value, the second threshold value being lower than the first threshold value, and after determining that the compressor is unable to build up the air pressure of the air tank, use only the electric brake actuator in case of new braking actions, and
  after determining that the air pressure measured at step a) is between the first and the second threshold values, use the pneumatic brake actuator and the electric brake actuator together in case of new braking actions.

14. A vehicle equipped with a braking system according to claim 13.

* * * * *